Feb. 23, 1960 F. K. MUELLER 2,925,736
GYROSCOPIC ACCELEROMETER
Filed April 15, 1958 2 Sheets-Sheet 1

INVENTOR:
FRITZ K. MUELLER

Feb. 23, 1960  F. K. MUELLER  2,925,736
GYROSCOPIC ACCELEROMETER
Filed April 15, 1958  2 Sheets-Sheet 2

INVENTOR:
FRITZ K. MUELLER

United States Patent Office 2,925,736
Patented Feb. 23, 1960

2,925,736

GYROSCOPIC ACCELEROMETER

Fritz K. Mueller, Huntsville, Ala.

Application April 15, 1958, Serial No. 728,757

18 Claims. (Cl. 74—5.6)

(Granted under Title 35, U.S. Code (1952), sec. 266)

The invention described herein may be manufactured and used by or for the Government for governmental purposes without the payment of royalty thereon.

This invention relates to a gyroscopic accelerometer. Such an instrument comprises a gyroscopic rotor mounted in gimbals by means of bearings on the following three axes: the axis on which the gyroscope spins (within its supporting cage, or casing) known as the spin axis; the axis on which the said casing turns (within its supporting housing) and about which the torques to be measured are applied to the gyroscope, known as the sensitive axis; and the axis on which said housing turns and about which the gyroscope precesses due to application of such torques, known as the precession axis. Unbalancing masses are placed on the rotor cage at a point or points offset from the sensitive axis, so that any acceleration on the housing that applies a couple about the sensitive axis causes a tendency toward relative rotation of the heavier masses, about the sensitive axis. The gyroscope translates this tendency into rotation about its precession axis, and the amount of this angular rotation measures the acceleration. The rotation may constitute or cause a signal that indicates and/or measures the acceleration.

Since any torque about the sensitive axis causes a precession about the precession axis, or vice versa, a problem in the design of a very accurate gyroscope lies in the elimination of the effects of all torques about each of these axes excepting those accelerations about the sensitive axis that are to be measured and signalled. One of said undesired effects is caused by gravitational acceleration of the gyroscope when the line of this acceleration is at an angle to the gyroscope's sensitive axis. However, the precessing torque on the rotor that is caused by this natural and law-delimited force may be rather exactly computed, and a correction for it may be superimposed on the signal, so that its effect is taken out of the final measurement of unpredicted accelerations. Another undesirable couple that tends to produce inaccuracy is that due to friction in the precession-axis bearings for the housing trunnions. The second accuracy-disturbing couple may be compensated for by drivingly connecting one of the trunnions with a correction motor. But correction by such a motor is not feasible for removing the effect of a third undesirable couple, namely, the frictional couple on the sensitive-axis bearings of the inner casing of the gyroscope. Therefore, great reduction or elimination of friction in these sensitive-axis bearings, especially in combination with the other two of the above-mentioned corrections, is vital to an accurate accelerometer.

One previous attempt to solve this problem comprised the floating of a gyroscope and its supporting inner casing or can on a liquid. But the inherent placing of the center of gravity of such an accelerometer can and its contents to one side of its center of buoyancy cocked the can, so that one of its ends contacted the metal of its supporting housing. When pivot bearings of the jewel type are used for the ends of such a liquid-buoyed can, the cocking of the can places a large amount of friction on the pivot bearings.

It is an object of the present invention to provide a gyroscopic accelerometer in which the gyroscope and its inner casing are supported on the sensitive axis of the gyroscope by a gaseous bearing.

Another object of the invention is to provide a gyroscopic accelerometer in which the gyroscope rotates in an hermetically sealed can and in which said can is journaled on the gyroscope's sensitive axis by means of an air bearing.

A further object is to provide a gyroscopic accelerometer that produces a signal in which the friction of ball or roller bearings on the gyroscope's precession axis is compensated for and in which friction producing a couple about the gyroscope's sensitive axis is nearly eliminated.

The foregoing and other objects of the invention will become more fully apparent from the following detailed description of an exemplary embodiment thereof and from the accompanying drawings, in which.

Figure 1:
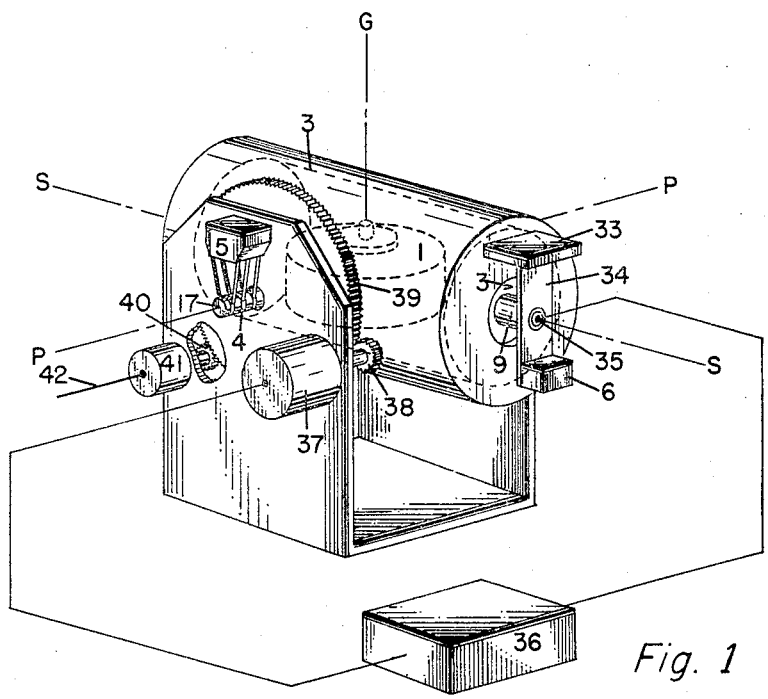
Figure 1 is a perspective view of one embodiment of my invention.

With reference to the drawings, the invention comprises a gyrosope 1, mounted for rotation within hermetically sealed inner casing or can 3 by means of bracket 2, to which the stator of the gyroscope is fixed. The rotor of the gyroscope is turned by an electric motor, which receives current from slip rings 4, that are connected through plug 5 to an outside source of current.

Figure 2:
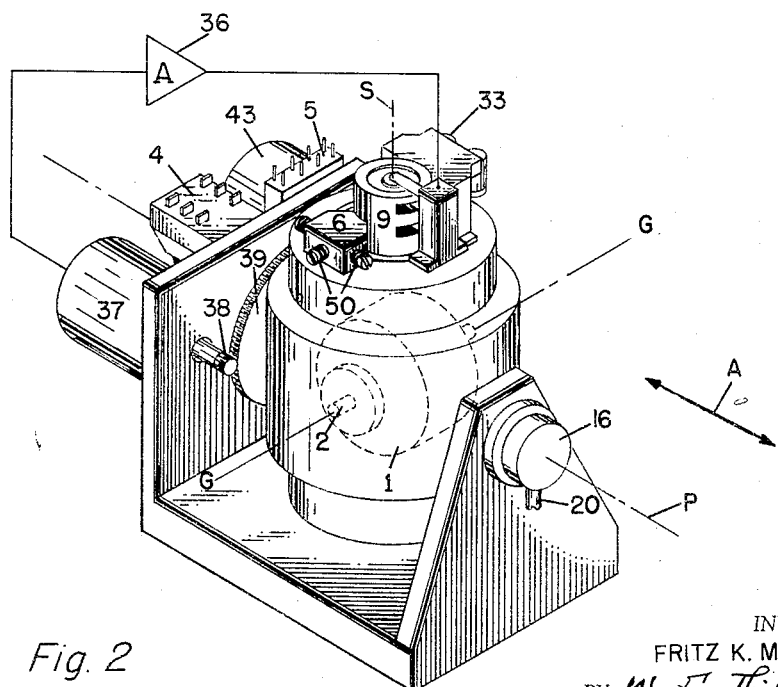
Figure 2 is a perspective view of another embodiment of the invention.
Figure 3:
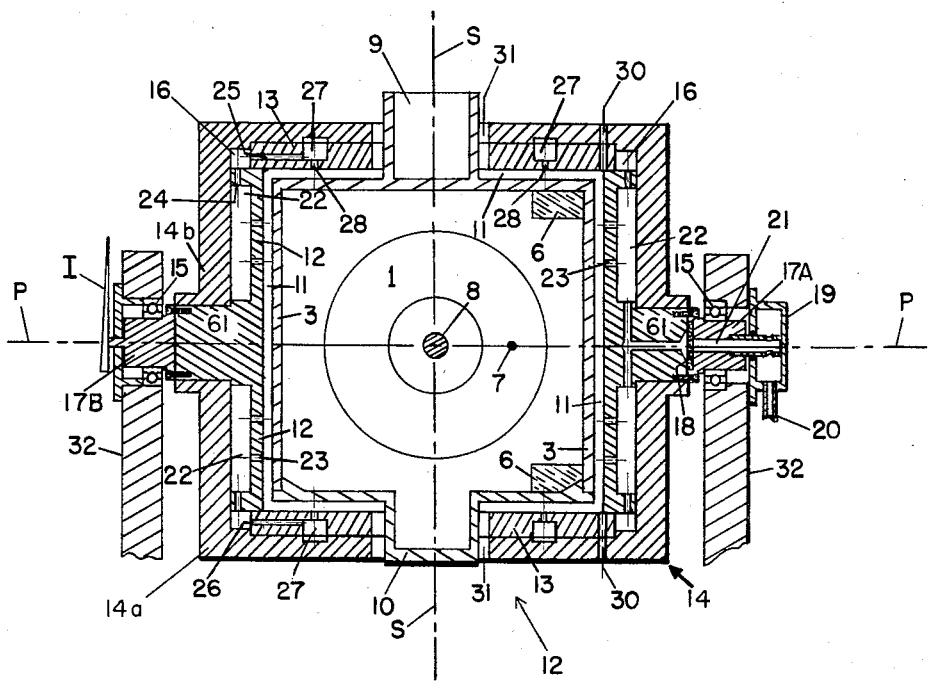
Figure 3 is an elevational view in section taken axially of a gyroscope and set of bearings that are utilized in the accelerometers of Figures 1 and 2, but showing an alternative location of the unbalancing masses.
Figure 4:
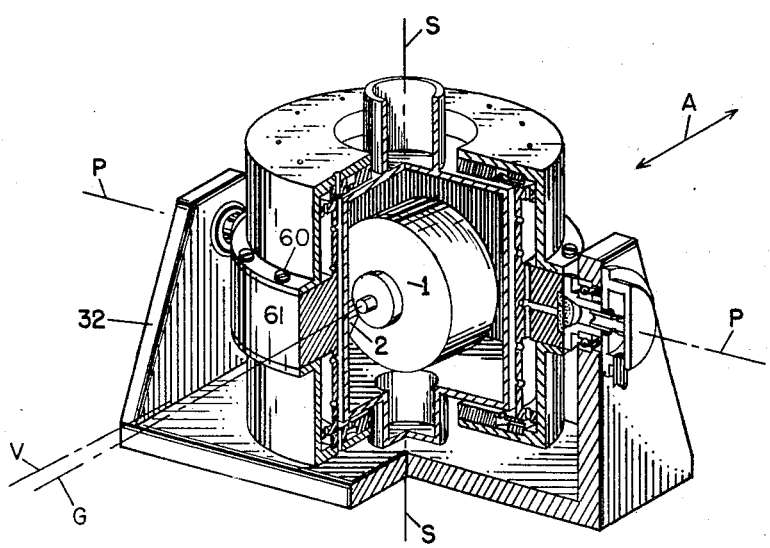
Figure 4 is a perspective view of another embodiment of the invention, with part of the housing of the gyroscope shown as cut away.

In addition to gyroscope 1 and its bearings, can 3 may support unbalancing masses 6 which offset the center of gravity 7 of the can and its contents from the can's center of volume, 8, and thus from the sensitive axis. Screws 50, such as are shown in Figure 2, may be used to provide vernier adjustment of these masses. Instead of utilizing such masses, offsetting of the center of gravity may be achieved, as shown in Figure 4, by offsetting the gyroscope's spin axis, G, from the line V that extends through the center of volume of the can. In Figure 3, masses 6 are shown as located inside the can, and in Figures 1 and 2 as supported outside the can by attachment to neck 9. At the end of the can opposite neck 9 there may be provided another trunnion-like projection, 10, which, together with neck 9, aids in maintaining the cylinder of the can in proper position with clearance 11.

The axis of the cylinder of the can and its necks coincides with the sensitive axis S of the gyroscope. On this sensitive axis the cylinder of the freely mounted can has a tendency toward relative rotation with respect to rotatable housing 12—13—14 when an acceleration in the direction of one of the arrows A (shown in Figures 2 and 4) exerts a force on support 32 (which is fixed to a moving vehicle or the like), and via precession axis P on the whole of the gyroscope.

Housing 12—13—14 comprises outer casing 14, formed in two parts, 14a, 14b, which are bolted, by means of bolts 60, to annular flange 61 on a liner that is fixed. Fixed to the outer casing, as by press-fitting, this liner comprises cylinder 12 and end plates 13. Between the liner and the casing there are provided spaces 16, 22 and 27 for the reception of compressed air or other gas. The housing is journaled on support 32, about precession axis P, by means of antifriction bearings 15, and has projecting from its ends, and extending through the bearings, trunnions 17A and 17B, which are also bolted, to annular flange 61. Trunnion 17A carries within it a replaceable filter 18 and has supported on its surface a stationary slip ring 19 for the transfer of compressed air or other gas from an outside source 20 of compressed gas to passages 21 within the trunnion. Gas under pressure is supplied from conduits 21 to recess 22 in cylinder 12, and thence through apertures 23 into the clearance 11, thus supporting can 3 away from the housing liner 12—13 at all points. From the clearance, gas under pressure goes through ports 24 into space 16 and thence through ports 25 and 26 to annular groove 27, from which pressurized gas may be supplied to clearance 11, via ports 28. In addition to serving as gas-supply means, spaces 22, 16 and 27 function as vibration-damping or stabilizing reservoirs, because, during surges of pressure in the supporting film of gas, they may either receive or supply gas to clearance 11. Freedom of the gas to flow in these dual paths of communication tends to cause constant pressure in the compressed-gas film.

From clearance 11 the air or other gas escapes, from the accelerometer, via ports 30 and 31, either into the atmosphere or via conduits to the inlet of a compressor or the like.

In operation of the device of Figure 3 or Figure 4, when an acceleration of the missile, aircraft, ship or other carrier of the accelerometer occurs in the direction of one of the arrows A, across axis P, support 32 and housing 12—13—14 are moved with the carrier. The axis S of can 3 also is accelerated with the carrier, and with housing 12—13—14. However, the side of can 3 that is unbalanced, due to masses 6 in Figure 3 (or the offset mass of the gyroscope in Figure 4), having considerable inertia and being pivoted on S with a nearly frictionless bearing, has a tendency to hold its position in space against the acceleration, and therefore to move, relatively, in housing 12 in a direction opposite to the acceleration. This movement applies a torque on the spinning disk of the gyroscope 1; and the gyroscope thus precesses on precession axis P. The consequent turning of trunnions 17A and 17B is an indication of the acceleration. On the trunnion 17B a pointer, potentiometer, synchro transmitter or other acceleration-indicating device may be mounted. In Figure 3, an indicating pointer I is shown.

The device thus far described indicates, but only roughly measures, accelerations. This is due to the fact that the couple from the friction on ball or roller bearings 15, exerted about axis P, tends to cause precession of the gyroscope about axis S, with consequent inaccuracy. In Figures 1 and 2 there is shown a means for correcting this inaccuracy-causing precession about axis S. This means comprises an inductive pickup 33, which consists of differential transformer coils and an element 34 fixed to neck 9 of can 3, which pivotally moves with the can as it precesses due to the frictional couple on bearings 15. A voltage that signals and measures such movement is picked up by axial contact 35 and transmitted via amplifier 36 to correction motor 37. Motor 37 rotates gears 38 and 39, thereby placing a torque on trunnion 17B, which compensates for the frictional couple.

Housing 12—13—14, rotating in precession due to acceleration, turns gear 39, which in turn rotates gear 40. In the embodiment of Figure 1 gear 40 actuates a potentiometer 41, which transmits a voltage via conductor 42 to an indicator, computer, control motor, or the like. In the embodiment of Figure 2, gear 40 turns a synchronous generator or transmitter 43, which sends an electrical signal to a synchronous motor. Such a motor may be used for various purposes, for example, in a computer.

The invention comprehends various obvious changes in the embodiments herein illustrated, within the scope of the appended claims.

The following invention is claimed:

1. A gyroscopic accelerometer comprising a housing, bearings rotatably supporting the housing on an axis, a casing mounted on a second axis within the housing with a clearance between the housing and casing, a gyroscope mounted for spinning on a third axis within said casing, at least two of said axes being mutually orthogonal, means for offsetting the center of mass of the contents of said casing from a plane that is normal to said bearings axis and passes through the center of volume of said casing, and means for supplying compressed gas to said clearance.

2. An accelerometer as set forth in claim 1, in which the said gas is air.

3. An accelerometer as set forth in claim 2, in which the said casing is an hermetically sealed can.

4. An accelerometer as set forth in claim 1, in which said housing comprises a liner, and said means for supplying compressed gas includes ports in the liner leading to said clearance and a recess in the liner opening away from said clearance and in communication with said ports.

5. An accelerometer as set forth in claim 4, in which said ports are cylindrical and said liner comprises a surface at said clearance that is smoothly continuous except at the points of debouchment of said cylindrical ports into said surface.

6. An accelerometer as set forth in claim 1, in which said offsetting means comprises a mass located at one side of the third axis.

7. An accelerometer as set forth in claim 6, in which said mass includes screws for adjustment of the center of said mass.

8. An accelerometer as set forth in claim 1, in which said offsetting means comprises bearings for journalling the gyroscope that are located at one side of the center of volume of said casing.

9. An accelerometer as set forth in claim 1, in which said bearings are antifriction bearings.

10. An accelerometer as set forth in claim 9, which further comprises means for exerting a torque about the first-mentioned axis that substantially counteracts the frictional couple of the bearings about said axis.

11. An accelerometer as set forth in claim 10, in which said torque-exerting means comprises means for supplying a signal that indicates pivotal, precessional movement of the casing relative to the housing, and means influenced by said signal for turning said housing in a direction opposite to the effect of said frictional couple.

12. An accelerometer as set forth in claim 11, in which said housing includes a trunnion and said signal-influenced means comprises a motor and gearing connecting the motor and trunnion.

13. An accelerometer as set forth in claim 1, in which said first axis coincides with the precession axis of said gyroscope, in which said second axis is the sensitive axis of said gyroscope, in which an acceleration that is indicated by the accelerometer is transverse to the plane thru said sensitive axis and said center of mass, and thus places a torque on the spinning mass of said gyroscope tending to turn it about said sensitive axis and causing it and said housing to precess about said precession axis, and in which said housing includes an element which indicates movement of said housing and thereby indicates acceleration exerted on the housing and its bearings.

14. An accelerometer as set forth in claim 13, in which said element is a trunnion, journaled in a set of bearings.

15. An accelerometer as set forth in claim 13, which further comprises means connected with said element for transmitting a signal measuring said acceleration to a point outside said accelerometer.

16. An accelerometer as set forth in claim 15, in which said last-named means comprises a potentiometer.

17. An accelerometer as set forth in claim 15, in which said last-named means comprises a synchronous generator.

18. A gyroscopic accelerometer comprising: a bearing support that is subject to accelerations; bearings on said support; a composite housing journaled by said bearings that includes an outer casing having an aperture at one of its ends, a cylindrical liner therein that contains the axis of said bearings, end plates fixed to said liner and trunnions supported by said bearings, said outer casing, liner and end plates having recesses providing spaces therebetween; an inner casing having a neck portion that extends through said aperture and having a clearance between all points of its surface and said housing; a gyroscope rotatingly journaled within said casing on a spin axis that is normal to said bearings axis, having a precession axis that coincides with said bearing axis and a sensitive axis that coincides with the axis of said neck in its centered position; means for offsetting the center of mass of the contents of said inner casing from a plane that is normal to said bearings axis and contains said sensitive axis and passes through the center of volume of said inner casing, whereby an acceleration transverse to the plane thru said sensitive axis and center of mass places a couple on said center of mass about said sensitive axis, causing said gyroscope to precess on said precession axis; and means for supplying compressed gas to said recesses and said clearance, whereby said inner casing is supported on a sheath of compressed gas; means for compensating for the frictional couple on said bearings; and means for signalling said acceleration, responsive to the turning of said housing relative to said bearing support.

References Cited in the file of this patent

UNITED STATES PATENTS

| | | |
|---|---|---|
| 1,801,947 | Boykow | Apr. 21, 1931 |
| 2,020,165 | Straatman | Nov. 5, 1935 |
| 2,461,521 | Clopton | Feb. 15, 1949 |
| 2,817,974 | Muzzey et al. | Dec. 31, 1957 |
| 2,878,006 | Sedgfield | Mar. 17, 1959 |